United States Patent
Forti et al.

(10) Patent No.: US 10,871,113 B2
(45) Date of Patent: Dec. 22, 2020

(54) METHOD FOR MANAGING PINKING IN A CONTROLLED-IGNITION INTERNAL COMBUSTION ENGINE

(71) Applicants: Continental Automotive France, Toulouse (FR); Continental Automotive GmbH, Hannover (DE)

(72) Inventors: Olivier Forti, Osny (FR); Alexandre Haguet, Cergy (FR)

(73) Assignees: Continental Automotive France; Continental Automotive GmbH

(*) Notice: Subject to any disclaimer, the term of this patent is extended or adjusted under 35 U.S.C. 154(b) by 0 days.

(21) Appl. No.: 16/489,020

(22) PCT Filed: Mar. 14, 2018

(86) PCT No.: PCT/FR2018/050607
§ 371 (c)(1),
(2) Date: Aug. 27, 2019

(87) PCT Pub. No.: WO2018/172665
PCT Pub. Date: Sep. 27, 2018

(65) Prior Publication Data
US 2020/0003136 A1    Jan. 2, 2020

(30) Foreign Application Priority Data

Mar. 24, 2017    (FR) .................................... 17 52457

(51) Int. Cl.
*F02D 35/02*    (2006.01)
*F02D 41/28*    (2006.01)
(Continued)

(52) U.S. Cl.
CPC ........... *F02D 35/027* (2013.01); *F02D 41/28* (2013.01); *F02D 41/2416* (2013.01);
(Continued)

(58) Field of Classification Search
CPC ....... F02D 2041/1432; F02D 2041/288; F02D 35/027; F02D 41/2416; F02D 41/28;
(Continued)

(56) References Cited

U.S. PATENT DOCUMENTS

2004/0260453 A1* 12/2004 Sauler .................. G01L 23/225
701/111
2011/0153182 A1    6/2011 Sasaki
(Continued)

FOREIGN PATENT DOCUMENTS

EP    1840361 A1    10/2007
EP    2339313 A1    6/2011
(Continued)

OTHER PUBLICATIONS

International Search Report and Written Opinion for International Application No. PCT/FR2018/050607, dated May 8, 2018—9 pages.

*Primary Examiner* — Hai H Huynh
*Assistant Examiner* — Diem T Tran
(74) *Attorney, Agent, or Firm* — RatnerPrestia

(57) ABSTRACT

A method for managing knock in a cylinder of an internal combustion engine, in a system including at least one acoustic sensor and a processor, in order to take into account acoustic pollution resulting from a noise, the method including: forming and digitizing the signals of the acoustic sensor, applying a bandpass filter to obtain a filtered noise, determining an adjustable gain-correction function using a gain-correction curve and, depending on the angular position of the end of injection, the point on the gain-correction curve to be used to convert the filtered noise into a corrected knock score, comparing a corrected knock score thus obtained to a knock decision threshold, to correct the timing advance, the gain-correction curve being defined by a calibration value and four angular points obtained by calculation based on the (Continued)

start and end positions of a knock-observation window and on a known characteristic of the noise.

10 Claims, 3 Drawing Sheets

(51) Int. Cl.
*F02D 41/24* (2006.01)
*F02D 41/14* (2006.01)
*F02P 5/152* (2006.01)

(52) U.S. Cl.
CPC ........... *F02D 2041/1432* (2013.01); *F02D 2041/288* (2013.01); *F02P 5/152* (2013.01)

(58) Field of Classification Search
CPC ...... F02P 5/152; G01L 23/222; G01L 23/227; Y02T 10/46
See application file for complete search history.

(56) References Cited

U.S. PATENT DOCUMENTS

2012/0192835 A1* 8/2012 Matsushima ........... F02P 5/152
 123/436
2016/0281624 A1* 9/2016 Dames .................... F02D 41/40

FOREIGN PATENT DOCUMENTS

WO 03040677 A1 5/2003
WO 2005031137 A1 4/2005

* cited by examiner

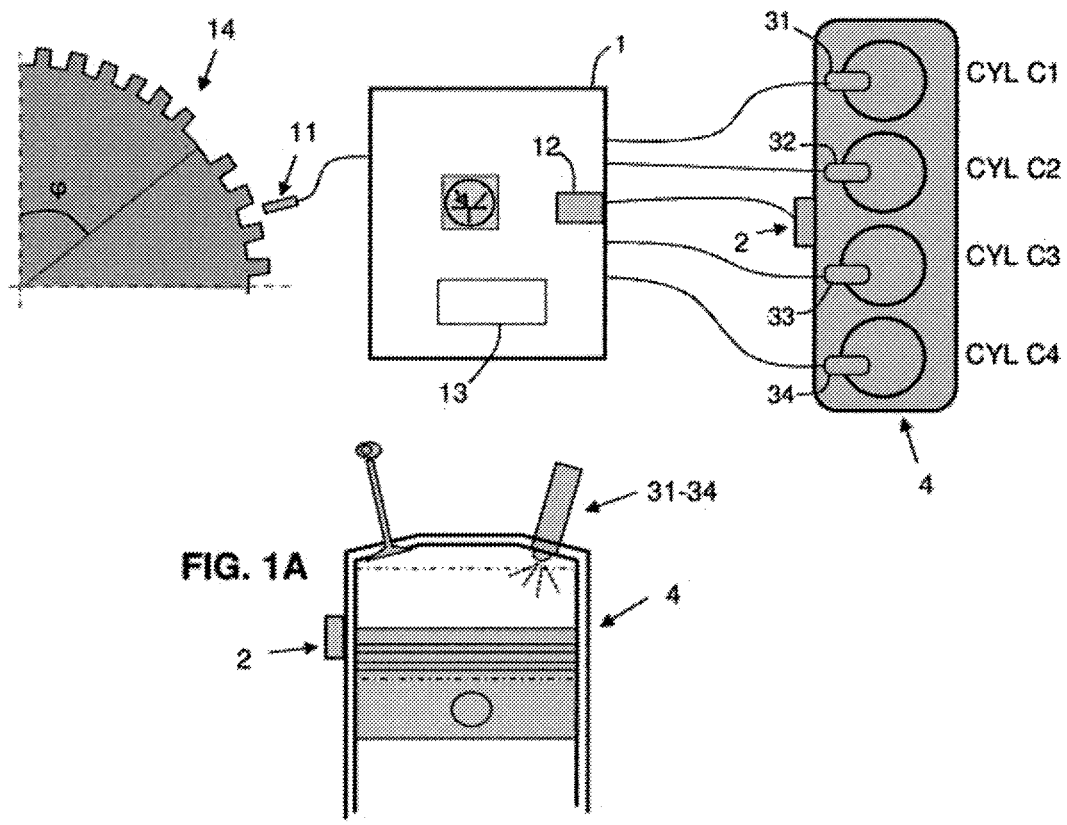
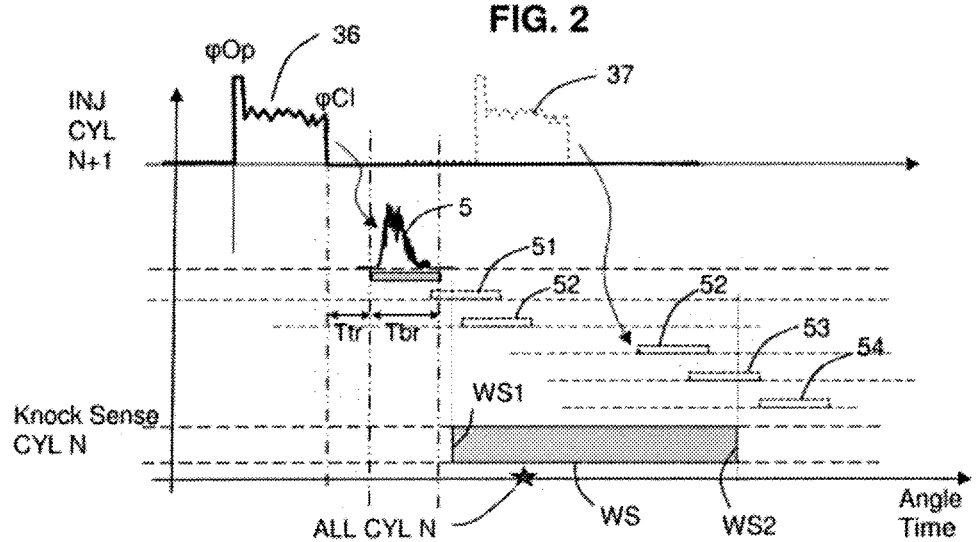

METHOD FOR MANAGING PINKING IN A CONTROLLED-IGNITION INTERNAL COMBUSTION ENGINE

CROSS REFERENCE TO RELATED APPLICATIONS

This application is the U.S. National Phase Application of PCT International Application No. PCT/EP2018/050607, filed Mar. 14, 2018, which claims priority to French Patent Application No. 1752457, filed Mar. 24, 2017, the contents of such applications being incorporated by reference herein.

FIELD OF THE INVENTION

The present invention relates to methods for detecting and evaluating a level of knock in a cylinder of a controlled-ignition internal combustion engine.

BACKGROUND OF THE INVENTION

In controlled-ignition engines, a spark-plug spark is generated by an electrical pulse controlled by an electronic processor, this pulse being positioned with respect to the top dead center to cause ignition with a certain timing advance.

In certain cases, the compressed mixture may be subject to auto-ignition, which effect is to be avoided.

If the timing advance is too great or if auto-ignition occurs, the effect known as knock may be observed.

For this reason, engine control systems now incorporate a knock-detection function, based on an acoustic, and in particular piezoelectric, sensor installed on the cylinder casing.

The presence of significant signals in a certain frequency range, typically between 5 kHz and 25 kHz, is characteristic of the presence of such a knock effect. If knock is detected, then the ignition timing advance must be decreased.

However, the detection of the knock effect may be polluted by parasitic auxiliary noises. For example, it has been discovered that the closure of an injector generates a noise that comprises frequency components in the spectral range of interest for knock.

Depending on the various operating conditions of the engine, the angular position of the closure of each injector varies.

To detect knock, for each cylinder, provision is generally made for an observation time window, in order to remove parasitic noises that do not coincide temporally with the moment at which knock may appear.

However, under certain engine operating conditions, the noise of an injector closing may 'fall' in the observation time window and may cause non-detections or wrongful detections.

Document US2012192835A1, incorporated herein by reference, proposes a solution aiming to decrease this problem. However, in the case where the angular position of the closure of the injector varies rapidly or discontinuously, there remain cases of non-detection and/or cases of wrongful detection.

Document WO 03/040677A1, incorporated herein by reference, relates to a method for suppressing noise interfering with detection of knock in an internal combustion engine. The knock sensor is connected in a known way to an evaluating integrated circuit via an input circuit. In the knock-sensor-evaluating integrated circuit, the high-frequency sensor signal is amplified, filtered and, during an observation period (measurement time window), integrated.

The concept on which this document is based is that the sound transmitted by a structure, and that comes from an identifiable source of interference, such as an injector valve, is used to determine a signal correction value that is subtracted from the integral value of the signal of the shock sensor, so that only the sound due to knock is evaluated.

SUMMARY OF THE INVENTION

There is therefore a need to improve existing solutions in order to provide a method for evaluating knock that is not affected by the fact that a parasitic noise (such as the noise of injector closure) may 'fall' in the knock observation time window.

To this end, a method is here proposed for managing (namely detecting/evaluating/correcting) knock in a cylinder of an internal combustion engine, the method being implemented in a system comprising at least one acoustic sensor and a processor (processing unit), the method being intended to take into account acoustic pollution resulting from a known repeatable parasitic noise of variable temporal position, the method comprising:

forming and digitizing the signals delivered by the acoustic sensor, applying a bandpass filter in order to preserve only the frequency range of interest for knock, in a filtered noise, determining an adjustable gain-correction function using a gain-correction curve, intended to decrease the influence of the parasitic noise, determining, depending on the angular position of the end of injection, the point on the gain-correction curve to be used to convert the filtered noise into a corrected knock score, comparing a corrected knock score thus obtained to a knock decision threshold, deducing therefrom an ignition timing advance correction value to be applied in the next cycle, characterized in that the gain-correction curve is defined by a calibration value and four angular points, said four angular points being obtained by calculating, based on the start and end positions of the knock-observation window and at least one known characteristic of the noise, the calibration value (Gin) being a gain value at which the decrease is the greatest representing the bottom plateau of the gain-correction curve between the second and third angular points (B, C), and the gain-correction curve taking the value 1 for points prior to the first angular point (A) and for points subsequent to the fourth angular point (D).

By virtue of the above arrangements, it is possible to very greatly decrease the influence of a parasitic noise that falls in the observation window, without substantially modifying the pre-existing software structure. The use of the gain G lower than 1, instead of an offset as described in document WO 03/04677A1, allows the dispersion of the results to be decreased by a factor G, this having no impact on the dispersion/score ratio since the gain G is also applied to the score. In contrast, the coefficient G is also applied to the threshold of detection of knock, which is not the case in the offset method. A curve of the ratio between the dispersion and the threshold would show that this ratio in the gain case is always lower than the ratio in the offset case. The zone of uncertainty about the detection threshold is therefore smaller with the gain and the quality of the detection is improved thereby.

The gain correction is applied immediately with no delay when the injected closure varies rapidly or in hops and falls in the observation window.

In various embodiments of the invention, there may possibly furthermore be recourse to one and/or the other of the following provisions:

According to one option, the four angular points are calculated based on a characteristic of the duration of the noise and on a characteristic of the transmission time of the noise to the acoustic sensor, these two values being taken to be known characteristics of the noise.

Advantage thus obtained: knowing only two parameters relative to the parasitic noise, it is possible to construct the correction curve that will allow the effect of this parasitic noise to be attenuated.

According to one option, the parasitic noise in question is a noise of injector closure. It turns out that this noise is sometimes preponderant because it comes from a nearby source, fastened directly to the cylinder casing.

In practice, it is a question of the noise of closure of the injector of the following cylinder in the cycle, i.e. the cylinder that follows the cylinder in which combustion is in progress in the operating sequence of the engine.

According to one option, the transmission time of the noise is obtained from a set of transmission-time parameters, one parameter for each (cylinder at end of injection, cylinder in which combustion is in progress) pair. Advantageously, the geometric configuration on the engine is thus taken into account by way of these transition times, which may be different for each pair of successive cylinders in the sequence.

According to one option, a linear interpolation is used to obtain the values of the correction curve between the first and second angular points, and between the third and fourth angular points. Advantageously, this simple calculation is very rapid and utilizes very few of the resources of the microcontroller.

According to one option, to calibrate the calibration value, a simple two-dimensional calibration depending on engine load and engine speed is used. Advantageously, this calibration is simple and consumes very little memory.

According to one option, the calibration values are comprised between 0.25 and 1.

According to one option, the calibration values decrease as the engine load increases.

According to one option, the abscissae Xa, Xb, Xc, Xd of the four angular points are calculated as follows:

$$Xa = WS1 - (Tbr + Ttr) * 6 * RPM$$

$$Xb = WS1 - (Ttr) * 6 * RPM$$

$$Xc = WS2 - (Tbr + Ttr) * 6 * RPM$$

$$Xd = WS2 - (Ttr) * 6 * RPM$$

where:
WS1 and WS2 are the start and end positions of the knock-observation window, expressed in degrees of rotation of the crankshaft, respectively,
Tbr is a characteristic of the duration of the noise expressed in seconds,
Ttr is a characteristic of the transmission time of the noise to the acoustic sensor expressed in seconds,
RPM is the engine speed expressed in revolutions per minute.

According to one option, the knock decision threshold KTC is determined by the expression $KTC = G*KT + 1 - G$, where:

KT is the threshold in the absence of noise, and
G is the value on the correction curve at the point of the angle of closure of the injector.

According to one option, the method is carried out in real-time, for each cylinder and in each cycle. Advantageously, there is no delay in taking into account changes; for example, if the injector closure hops by an angle, the new situation is taken into account immediately.

According to one option, the passband of the bandpass filter is [5 kHz-25 kHz]. Thus, advantageously, any noise that is located outside of this band is eliminated.

An aspect of the invention also relates to a system for managing knock in a cylinder of an internal combustion engine, the system comprising at least one acoustic sensor and a processor, characterized in that the latter is configured to implement the method such as described above.

BRIEF DESCRIPTION OF THE DRAWINGS

Other features and advantages of aspects the invention will become apparent from the following description, which is given by way of nonlimiting example with reference to the appended drawings, in which:

FIGS. 1 and 1A schematically show the system and components in which the method according to an aspect of the invention is implemented, FIG. 2 shows an illustrative timing diagram.

DETAILED DESCRIPTION OF THE PREFERRED EMBODIMENTS

Figure 3:
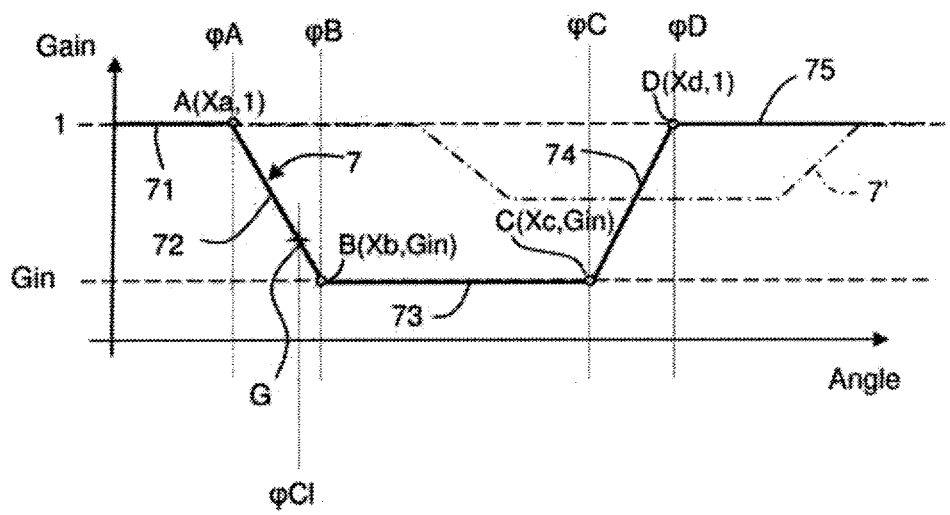
FIG. 3 illustrates the gain-correction curve.

In the various figures, the same references have been used to reference identical or similar elements. For the sake of clarity of the description, certain temporal elements are not shown to scale.

In FIG. 1, a processor 1 for managing a combustion engine, typically a gasoline internal combustion engine, has been shown.

The illustrated example is based on a four-cylinder engine, but the method may equally well be applied to a three-cylinder engine, or even to a six-cylinder in-line or V engine.

It will be noted that an aspect of the invention could be applied to a liquid-petroleum-gas (LPG) engine, and more generally to any controlled-ignition internal combustion engine.

Each of the cylinders is equipped with a fuel injector with an injection nose that opens directly into the combustion chamber: an injector 31 in the first cylinder CYL C1, an injector 32 in the second cylinder CYL C2, an injector 33 in the third cylinder CYL C3, and an injector 34 in the fourth cylinder CYL C4.

On the cylinder casing 4 (also called the "engine block") a knock sensor 2 is installed, which is connected by a cable, in general a shielded cable, to the engine processor. This sensor is an acoustic sensor and preferably a piezoelectric sensor; it is configured to be sensitive to the vibrations produced in the cylinder casing. It will be noted that the engine block 4 may be made of cast iron or of aluminum alloy.

In the illustrated example, the cylinder casing is equipped with a single acoustic knock sensor, but it could have a plurality thereof; in the case of motors comprising two rows of cylinders such as for example six-cylinder V or V6 engines or eight-cylinder V or V8 engines, there will be at least two knock sensors, one per row of cylinders.

As is known per se, the operation of the engine is based on a time-ordered sequence (admission, compression, combustion, exhaust) implemented in each of the cylinders, the successive order of the cylinders being set by design. In the illustrated example of the four-cylinder engine, the conventional order of ignition is CYL C1-CYL C3-CYL C4-CYL C2.

As known per se, the angular position of the crankshaft (generically referenced by $\varphi$) is known by virtue of a toothed or coded target 14, with a sensor 11 of position of the engine flywheel.

FIG. 2 illustrates a timing diagram that shows at the bottom a time segment centered on the combustion in cylinder N (CYL N) and that shows at the top the phase of injection of gasoline into the following cylinder in the sequence, which cylinder is referenced N+1.

In the cylinder N+1, an electrical signal 36 controlled by the processor causes the injector to open at the angular position $\varphi Op$ and the injector to close at the angular position $\varphi Cl$. This closure causes acoustic waves; in other words a noise that will propagate throughout the cylinder casing. As already mentioned in the introduction, the noise of this closure may coincide temporally with the window WS for observing knock in the cylinder N.

This observation window starts at the angular position WS1 and ends at the angular position WS2. The start WS1 of the observation window and the end WS2 of the observation window WS are the result of a pre-existing calibration that is known per se and not described in detail here.

Depending on the command 36, 37 dictated by the (mapped) engine operating point, the noise of the injector closure may fall just before the observation window (reference 5), it may fall so as to straddle the start of the observation window (reference 51), it may fall completely within the observation window (references 52), or it may fall so as to straddle the end of the observation window (reference 53) or after the observation window (reference 54).

It will be noted that in FIG. 2, the x-axis represents crankshaft angular position, this also corresponding to the passage of time, the conversion between the two being dependent on engine speed (denoted RPM below).

It will be understood that the noise of closure of the injector of the cylinder N+1 may therefore form a parasitic noise with respect to observation of knock in the cylinder N.

This noise has a known duration, of about one millisecond: the duration, which is denoted Tbr, is preferably indicated in a calibration parameter. One specific duration may be defined for each cylinder.

Another important feature for what follows is knowledge of the transmission time of the noise from its source to the knock sensor 2. This transmission time is denoted Ttr. It will be understood, in light of FIG. 1, that the transmission times Ttr for each cylinder are different or even very different, in particular because of the different distances. Therefore, provision is made to store a set of transmission-time parameters, and preferably one parameter for each (cylinder at end of injection, cylinder in which combustion is in progress) pair. In the illustrated example, the number of parameters may be limited to four; however a more complex parameterization may be employed, in particular if a second knock sensor is used.

The inventors have observed that the noise of injection closure is known and repeatable; the duration of this noise and the transmission time required for it to reach the knock sensor are simple parameters that are known in advance.

In contrast, what is not known in advance, but rather determined in real-time in each cylinder injection cycle, is the angular position $\varphi Cl$ corresponding to the moment of injector closure. This datum is calculated in real time based on a pre-existing complex calibration (i.e. one already available and implemented in conventional engine operation).

When the injector noise coincides partially or completely with the knock observation window, this causes an undesirable increase in noise level in the frequency range of interest (i.e. in the band [5 kHz-25 kHz]).

The inventors have astutely proposed to use a gain-correction curve 7 to greatly decrease the effects of this undesirable increase.

This gain-correction curve makes it possible to choose, depending on, the angle at which injected closure occurs, a gain G that is adjusted in real time between a base value of 1 band a gain value at which the reduction is strongest, namely Gin.

As illustrated in FIG. 3, the definition of the correction curve is based on the determination of four angular points (A, B, C, D).

It may be seen that this correction curve takes the value of unity (i.e. of 1) before a first angular point denoted A (segment 71). This corresponds to the case where injector closure generates a noise the effects of which are entirely located before the observation window WS. This correction curve also takes a value 1 after a fourth angular point denoted D (segment 75). This corresponds to the case where injector closure generates a noise the effects of which are entirely located after the observation window WS.

It may be seen that this correction curve takes the value denoted Gin between the second angular point denoted B and the third angular point denoted C. In this segment referenced 73, the curve forms a plateau taking the value Gin.

It will be seen below how the calibration value Gin is determined.

Between the first angular point denoted A and the second angular point denoted B, the curve 7 is rectilinear 72, in other words it is a question of a linear interpolation between the first and second angular points. Likewise, between the third angular point denoted C and the fourth angular point denoted D, the curve 7 is rectilinear 74, in other words it is a question of a linear interpolation between the third and fourth angular points.

Of course, instead of a linear interpolation, a different function taking into account the asymmetry of the noise, for example a difference in power between the start and end of the noise, could be used.

In FIG. 3, another example of a gain-correction curve has been shown with a dot-dashed line referenced 7'. Specifically, it will be noted that in each engine cycle, the limits WS1, WS2 of the observation window may change as may the engine speed RPM. In other words, the calculation is carried out in real-time in each combustion cycle of one of the cylinders.

Figure 4:
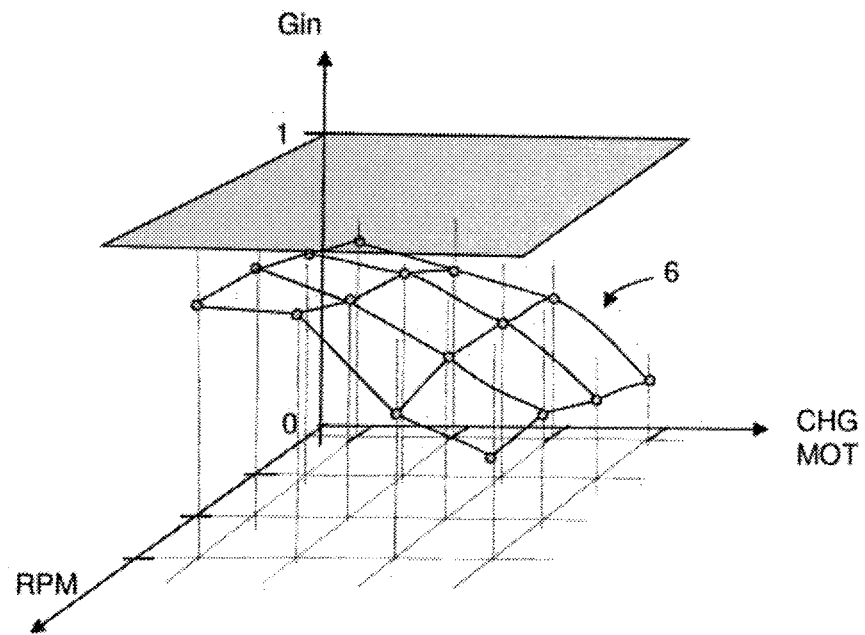
FIG. 4 illustrates a two-dimensional correction map.
Figure 5:
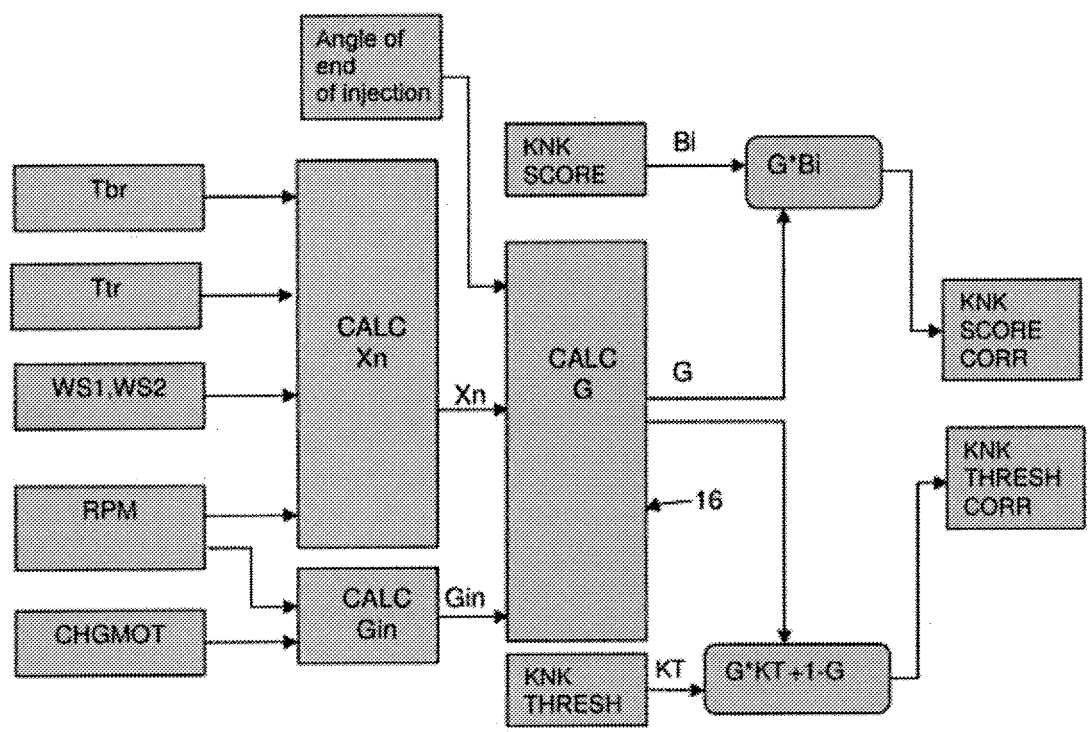
FIG. 5 shows a schematic block diagram of the correction-calculating process.
Figure 6:
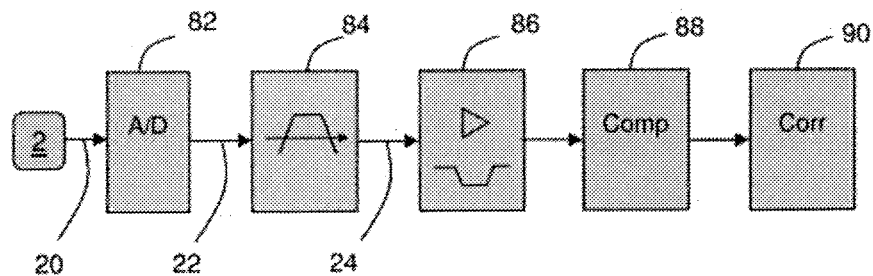
FIG. 6 shows a diagram illustrating the steps of the method.

FIG. 4 illustrates the calibration table that allows the value Gin to be obtained depending on engine operating point; it is a question of a two-dimensional calibration 6; in other words, a scalar value Gin is obtained in a two-dimensional space, the two dimensions of which are engine load CHG- MOT and engine speed or RPM. This type of calibration is very commonplace and therefore not described in more detail here.

It will firstly be noted that the values of Gin are always lower than or equal to 1; moreover, in the illustrated example, the values Gin are comprised between 0.25 and 1, this making it possible to achieve a decrease by a factor of as high as four, with a view to attenuating parasitic noise present completely in the observation window WS. However, lower values of Gin are not excluded.

The gain-correction curve may therefore be defined very simply by the four points of definition with their abscissae and their ordinates A(Xa, 1), B(Xb, Gin), C(Xc, Gin) and D(Xd, 1).

The invention claimed is:

1. A method for managing knock in a cylinder of an internal combustion engine, the method being implemented in a system comprising at least one acoustic sensor and a processor, the method being intended to take into account acoustic pollution resulting from a known repeatable parasitic noise of variable temporal position, the method comprising:
forming and digitizing signals delivered by the acoustic sensor,
applying a bandpass filter in order to preserve only a frequency range of interest for knock, in a filtered noise,
determining an adjustable gain-correction function using a gain-correction curve, intended to decrease the influence of the parasitic noise,
determining, depending on an angular position of a crankshaft at an end of injection, a point on the gain-correction curve to be used to convert the filtered noise into a corrected knock score,
comparing the corrected knock score thus obtained to a knock decision threshold,
deducing therefrom an ignition timing advance correction value to be applied in the next cycle,
wherein the gain-correction curve is defined by a calibration value (Gin) and four angular points (A, B, C, D), said four angular points being obtained by calculating, based on start and end positions (WS1, WS2) of a knock-observation window and at least one known characteristic of the noise, the calibration value (Gin) being a gain value at which the decrease is the greatest representing a bottom plateau of the gain-correction curve between the second and third angular points (B, C), and the gain-correction curve taking the value 1 for points prior to the first angular point (A) and for points subsequent to the fourth angular point (D).

2. The method as claimed in claim 1, wherein the four angular points are calculated based on a characteristic (Tbr) of the duration of the noise and on a characteristic (Ttr) of a transmission time of the noise to the acoustic sensor, these two values being taken to be known characteristics of the noise.

3. The method as claimed in claim 1, wherein the parasitic noise is a noise of injector closure.

4. The method as claimed in claim 1, wherein a transmission time (Ttr) of the noise is obtained from a set of transmission-time parameters, one parameter for each (cylinder at end of injection, cylinder in which combustion is in progress) pair.

5. The method as claimed in claim 1, wherein, to calibrate the calibration value (Gin), a simple two-dimensional calibration depending on engine load and engine speed is used.

6. The method as claimed in claim 2, wherein the four angular points (Xa, Xb, Xc, Xd) are calculated as follows:

$$Xa = WS1 - (Tbr + Ttr) * 6 * RPM$$

$$Xb = WS1 - (Ttr) * 6 * RPM$$

$$Xc = WS2 - (Tbr + Ttr) * 6 * RPM$$

$$Xd = WS2 - (Ttr) * 6 * RPM,$$

WS1 and WS2 being the start and end positions of the knock-observation window, expressed in degrees of rotation of the crankshaft, respectively,
Tbr being a characteristic of the duration of the noise expressed in seconds,
Ttr being a characteristic of the transmission time of the noise to the acoustic sensor expressed in seconds,
RPM being the engine speed expressed in revolutions per minute.

7. The method as claimed in claim 1, wherein the knock-decision threshold (KTC) is determined by the expression: KTC=G*KT+1−G, where:
KT is the threshold in the absence of noise, and
G is the value on the correction curve at the point of the angle of closure of the injector.

8. The method as claimed in claim 1, wherein the method is carried out in real-time, for each cylinder and in each cycle.

9. A system for managing knock in a cylinder of an internal combustion engine, the system comprising at least one acoustic sensor and a processor, and configured to implement the method as claimed in claim 1.

10. The method as claimed in claim 2, wherein the parasitic noise is a noise of injector closure.

* * * * *